US005350635A

United States Patent [19]
Pokorny

[11] Patent Number: 5,350,635
[45] Date of Patent: Sep. 27, 1994

[54] CYANATE RESIN ADHESIVE FOR POLYIMIDE FILM

[75] Inventor: Richard J. Pokorny, Maplewood, Minn.

[73] Assignee: Minnesota Mining and Manufacturing Company, St. Paul, Minn.

[21] Appl. No.: 994,693

[22] Filed: Dec. 22, 1992

[51] Int. Cl.$^5$ .................. C08G 65/34; C08G 59/06; B32B 27/38
[52] U.S. Cl. ................. 428/414; 428/473.5; 523/400; 525/403; 525/404; 525/540; 528/96
[58] Field of Search ............ 528/96, 422, 425; 523/400; 525/403, 404, 540; 428/414, 473.5

[56] References Cited

U.S. PATENT DOCUMENTS

| | | | |
|---|---|---|---|
| 4,429,112 | 1/1984 | Gaku et al. | 528/422 |
| 4,543,295 | 9/1985 | St. Clair et al. | 428/458 |
| 4,631,319 | 12/1986 | Blahak et al. | 525/437 |
| 4,904,760 | 2/1990 | Gaku et al. | 528/422 |

OTHER PUBLICATIONS

"Aracast Hydantoin Resins", Ciba-Geigy Resins Department Product Data sheets (2).
"Araldite MY 721", Ciba-Geigy Plastics Department Product Data sheets (1).
"Araldite MY 0510", Ciba-Geigy Plastics Department Product Data sheets (2).

*Primary Examiner*—John Kight, III
*Assistant Examiner*—John M. Cooney, Jr.
*Attorney, Agent, or Firm*—Gary L. Griswold; Walter N. Kirn; Warren R. Bovee

[57] ABSTRACT

Improvement in adhesion of cyanate resin adhesives by the addition of an epoxy resin. Polyether polyols may optionally be added to toughen the composition.

25 Claims, No Drawings

CYANATE RESIN ADHESIVE FOR POLYIMIDE FILM

BACKGROUND OF THE INVENTION

1. Field of the Invention

This invention relates to cyanate resin adhesives useful in adhering various materials to polyimide films and for laminating polyimide films together.

2. Description of Related Art

Polyimide polymers in the form of films, fibers and the like have many industrial uses where high temperature endurance is required. There are many applications for these materials that require bonding them with adhesives that are able to maintain their adhesive and mechanical properties at elevated temperatures. Cyanate resins are useful adhesives for high temperature applications because they have relatively high glass transition temperatures(Tg). However, these resins have relatively poor adhesion to polyimide films.

SUMMARY OF THE INVENTION

It has now been discovered that the adhesion of cyanate resin compositions to polyimide, as measured by the peel strength, can be improved by the addition of minor amounts of epoxy resin, preferably at least about 2.5 percent by weight and most preferably at least 5 percent, of epoxy resin based on the total weight of cyanate resin and polyester polyol resin. The addition of certain polyether polyols is also useful to toughen the adhesive for certain applications as described hereinafter.

DESCRIPTION OF THE PREFERRED EMBODIMENTS

Polyimide polymers are widely used in a variety of industrial applications. Polyimide films are used where flexible substrates having good high temperature properties are needed, for example in the lamination of circuit boards for electronic applications in hostile environments. Widely used materials are the "Kapton" films available from DuPont. These films come in a variety of grades, are well known and generally described in the literature.

The cyanate resins which are useful in the practice of the present invention are any of a number of polycyanate resins (sometimes referred to in the literature as polycyanic acid ester resins). Preferred are polycyanate resins (monomers or oligomers, the oligomeric forms sometimes being referred to as "prepolymers" in the literature) up to about 12,000 molecular weight and containing two or more cyanate functional groups connected by a backbone or bridge which includes aromatic moieties, such as substituted or unsubstituted phenyl radicals, connected by an intermediate bridging atom or group. The molecular weight is not particularly critical and is dictated by the viscosity of the oligomers and the particular application for the materials. Molecular weights above 12,000 may result in prepolymers which are too viscous for useful application, either in solution or as a cold or hot extrusion, or are relatively insoluble in the solvent of choice.

Typically the resins exist and are useful in the monomeric form or the partially homopolymerized, prepolymer forms which may range in physical state from tacky semisolids at approximately 30% conversion to friable solids at about 50% conversion. Neat polymers or solutions of monomers or prepolymers in solvents, such as MEK, are commonly available.

Polycyanate resins useful in the practice of the present invention are well known in the art. A number of polycyanate resins are described in U.S. Pat. No. 4,631,319 beginning at column 1, line 49 of the patent and continuing through column 5, line 46. These resins are described by the general formula $R(O-C\equiv N)n$ where n represents an integer equal to or greater than 2 and R represents an n-functional aromatic radical optionally connected by one or more bridge members. A preferred group of resins are the resins based on the bisphenol structure such as those derived from bis-(4-cyanatophenyl) containing various bridging groups.

Some useful, commercially available polycyanate resins are bisphenol A dicyanate, hexafluorobisphenol A dicyanate, and tetramethylbisphenol F dicyanate. These resins are available as medium molecular weight oligomers dissolved in MEK available as the "Aro Cy" series of resins from Hi-Tek Polymers, Jeffersontown, Ky. U.S.A. A dicyclopentadiene phenol novolac dicyanate is also available as Dow XU-71787.02 from Dow Chemical Company, Midland, Mich. U.S.A.

The epoxy resins which are useful in the practice of the present invention are the various liquid polyepoxide resins and the soluble, solid polyepoxide resins (including diepoxide resins) which contain trisubstituted nitrogen groups. The preferred epoxides contain trisubstituted nitrogen atoms where at least one of the substituents is an aromatic ring. If one or more of the substituents on the nitrogen is electron withdrawing (for example, carbonyl, halogen or a nitro group) then the polyepoxide provides less enhancement in adhesion than if the substituents are electron donating groups, like aromatic rings, amino groups, ethers or alkyl groups. Some epoxy resins which have been found useful in the practice of the present invention are methyl, ethyl hydantoin diepoxide (Aracast XU 238), N,N,N',N'-tetraglycidyl-4,4'-methylenebisbenzenamine (Araldite MY 721), 4-glycidyloxy-N,N-diglycidyl aniline (Araldite MY 0510) all available from Ciba Geigy Corporation, Hawthorne, N.Y., and mixtures thereof. Araldite MY721 and MY0510 are most preferred.

Generally these materials are present in an amount of at least 2.5 percent by weight based on the total weight of epoxy and cyanate resins and most preferably in an amount of at least 5 percent by weight in order to realize more significant improvement in peel strength. Generally no more than about 10 percent epoxy resin is used in order not to alter the desirable thermal properties of the cyanate resins.

The catalysts useful in the present invention are the catalysts known to be useful for catalyzing the cyanate curing reaction. A number of such catalysts are known. Representative catalysts are described in U.S. Pat. No. 4,631,319 where there is mentioned various imidazoles and imidazole adducts, tertiary amines, phenols, organo metallic salts, inorganic metal salts, peroxides, acid anhydrides, azo compounds and various catalysts suitable for curing epoxy resins. A specific catalyst which has been found useful is cobalt(III) acetyl acetonate.

Optionally, a polyether polyol may be added to the cyanate resin composition to improve the toughness of the compositions as described in copending application U.S. Ser. No. 07/994,694, filed Dec. 22, 1992. The polyether polyols useful in the present invention are the hydroxy terminated poly tetramethylene glycol polymers above 200 molecular weight and most preferably in the molecular weight range of about 400 to about 1000. Useful polyols are represented by the Poly THF series of polyols available from BASF Corporation, Parsippany, N.J. U.S.A. Typically the polyol will be present in amounts of about 10% to 30% by weight polyol, based on the combined weight of the polycyanate resin and polyol, and most preferably 10% to 20% polyol.

The compositions of the present invention may be employed as solutions in various organic solvents, such as MEK, or as solid compositions which may be applied by extrusion or melting as the use conditions may require. Generally solvent solutions are used where thin coatings of the compositions are desired, such as for laminating polymeric films together.

Compositions as shown in Table 1 were prepared by dissolving the cyanate resin in methyl ethyl ketone (MEK) at room temperature with stirring followed by addition of the other ingredients. The resin compositions were cured by heating in the range of 160° C. to 232° C. for sufficient time to obtain a cured composition.

applied to the outside of the Kapton film to reinforce it and the peel strength was measured as pounds per lineal inch of sample width according to ASTM D-1876-72 except that a crosshead speed of 0.3 inches per minute was used and the average peel strength of several samples recorded.

The test results reported in Table 1 as Examples 1–8 show that adding 10% by weight of the polyepoxide to a number of different cyanate resins (Examples 2, 4, 6 and 8) increases the peel strength of adhesive bonds between polyimide films compared to the control compositions (Examples 1, 3, 5 and 7). Examples 9–19 show the effect of adding from 2.5% to 10% by weight of a number of polyepoxides to a specific cyanate resin. In each case the peel strength of bonds to polyimide film is increased over the control without polyepoxide (Example 3). The addition of at least 5% polyepoxide results in more significant improvement than the addition of lesser amounts.

The results also show that the Araldite resins, which are more basic than the Aracast and Tactix resin due to the presence of electron donating groups on the trisub-

TABLE 1

|  | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|
| Aro Cy B-40S | 100 | 90.0 | | | | | | | | | | | | | | | | | |
| Aro Cy M-40S | | | 100 | 90.0 | | | | | 97.5 | 95.5 | 97.5 | 95.0 | 90 | 97.5 | 95.0 | 90.0 | 97.5 | 95.0 | 90.0 |
| Aro Cy F-40S | | | | | 100 | 90.0 | | | | | | | | | | | | | |
| Dow XU 71787.02 | | | | | | | 100 | 90.0 | | | | | | | | | | | |
| Cobalt III Acetyl Acetonate* | * | * | * | * | * | * | * | * | * | * | * | * | * | * | * | * | * | * | * |
| Araldite MY 0510 | | 10.0 | | 10.0 | | 10.0 | | 10.0 | 2.5 | 5.0 | | | | | | | | | |
| Araldite MY 0720 | | | | | | | | | | | 2.5 | 5.0 | 10 | | | | | | |
| Aracast XU 238 | | | | | | | | | | | | | | 2.5 | 5.0 | 10.0 | | | |
| Tactix 742 | | | | | | | | | | | | | | | | | 2.5 | 5.0 | 10.0 |
| Peel Strength (lb/in) | 0.22 | 0.73 | 0.06 | 0.47 | 0 | 0.66 | 0 | 0.63 | 0.23 | 0.44 | 0.35 | 0.38 | 0.41 | 0.07 | 0.29 | 0.54 | 0.09 | 0.11 | 0.19 |

*THE CATALYST IS PRESENT IN AN AMOUNT OF 0.012 PERCENT BY WEIGHT IN ALL COMPOSITIONS

In the table above, the polycyanate and polyepoxide materials are the following:

Aro Cy B-40S: a 75% solution of a 2650 MW oligomer of 2,2 bis-(4-cyanatophenyl) propane
Aro Cy M-40S: a 65% solution of a 2,870 MW oligomer of bis(4-cyanato 3,5 dimethylphenyl) methane
Aro Cy F-40S: a 75% solution of a 2,100 MW oligomer of 2,2 bis(4-cyanatophenyl) perfluoropropane
Dow XU 71787.02: bis (4-cyanatophenyl) dicyclopentadiene
Araldite MY0510: 4-glycidyloxy-N,N-diglycidyl aniline
Araldite MY0720: N,N,N',N'-tetraglycidyl-4,4'-methylenebisbenzenamine
Aracast XU238: methyl, ethyl hydantoin diepoxide
Tactix 742: tris (phenyl glycidyl ether) methane Peel strength test specimens were prepared by coating the compositions onto 2 mil Kapton film at a wet thickness of 0.4 mils. The samples were air dried and then laminated to a second 2 mil Kapton film. These laminated samples were then cut into one inch wide strips to form "T-peel" specimens. The test specimens were cured in a heated platen press using 50 psi pressure while heating at 160° C. for ½ hours followed by heating at 232° C. for another ½ hours. A reinforcing tape was stituted nitrogen, are more effective in enhancing adhesion. The Tactix, which contains no trisubstituted nitrogen, provides little to no enhancement of adhesion.

I claim:

1. A method of improving the adhesion of cyanate resin to polyimide film comprising admixing an epoxy resin selected from the group consisting of methyl, ethyl hydantoin diepoxide, N,N,N', N'-tetraglycidyl-4,4'-methylenebisbenzenamine, diglycidyl ether of para-aminophenol, and mixtures thereof, with said cyanate resin in an amount of at least about 2.5 percent by weight based on the total weight of cyanate resin and epoxy resin.

2. A method according to claim 1 wherein said method further includes admixing a polyether polyol with said cyanate resin and epoxy resin, said polyether polyol being present in an amount of about 10 percent to about 30 percent by weight, based on the total weight of cyanate resin and polyether polyol.

3. A method according to claim 1 or 2 wherein an amount of catalyst effective to promote the reaction of said resins is included in said admixture.

4. A method according to claim 3 wherein said catalyst is cobalt (III) acetyl acetonate.

5. A method according to claim 1 or 2 wherein said admixture is reacted to form an at least partially polymerized composition.

6. The reaction product produced by the method of claim 5.

7. A method according to claim 1 or 2 wherein said cyanate resin is an oligomer of a dicyanate monomer.

8. A method according to claim 7 wherein said dicyanate monomer is bis(4-cyanato-3,5 dimethylphenyl) methane.

9. A method according to claim 2 wherein said polyether polyol has a molecular weight of between about 400 and 1000.

10. A method according to claim 9 wherein said polyol is poly(tetramethylene ether) glycol.

11. An article comprising a first polyimide substrate adhered to a second polyimide polymer substrate by an interposed adhesive layer, said adhesive layer comprising:
a reaction product of an admixture of a cyanate resin and an epoxy resin, said epoxy resin being present in an amount of at least about 5 percent by weight based on the total weight of the cyanate resin and epoxy resin wherein
said epoxy resin is selected from the group consisting of methyl, ethyl hydantoin diepoxide, N,N,N',N'-tetraglycidyl-4,4'-methylenebisbenzenamine, diglycidyl ether of para-aminophenol, and mixtures thereof.

12. An article according to claim 11 wherein said admixture further includes a polyether polyol, said polyether polyol being present in said admixture in an amount of about 10 percent to about 30% by weight, based on the total weight of cyanate resin and polyether polyol.

13. An article according to claim 11 or 12 wherein an amount of catalyst effective to promote the reaction of said resins is included in said admixture.

14. An article according to claim 13 wherein said catalyst is cobalt (III) acetyl acetonate.

15. An article according to claim 11 or 12 wherein said cyanate resin is an oligomer of a dicyanate monomer.

16. An article according to claim 15 wherein said dicyanate monomer is bis(4-cyanato-3,5 dimethylphenyl) methane.

17. An article according to claim 12 wherein said polyether polyol has a molecular weight of between about 400 and 1000.

18. An article according to claim 17 wherein said polyol is poly(tetramethylene ether) glycol.

19. A composition for forming an adhesive polymer comprising a cyanate resin, an epoxy resin in an amount of at least 5 percent by weight based on the total weight of epoxy resin and cyanate resin, and a polyether polyol in an amount of about 10 percent to 30 percent by weight based on the total weight of cyanate resin and polyether polyol wherein said epoxy resin is selected from the group consisting of methyl, ethyl hydantoin diepoxide, N,N,N',N'-tetraglycidyl-4,4'-methylenebisbenzenamine, diglycidyl ether of para-aminophenol, and mixtures thereof.

20. A composition according to claim 19 which further includes a catalyst in an amount effective to promote the reaction of said components.

21. A composition according to claim 20 wherein said catalyst is cobalt (III) acetyl acetonate.

22. A composition according to claim 19 wherein said cyanate resin is an oligomer of a dicyanate monomer.

23. A composition according to claim 19 wherein said dicyanate monomer is bis(4-cyanato-3,5 dimethylphenyl) methane.

24. A composition according to claim 19 wherein said polyether polyol has a molecular weight of between about 400 and 1000.

25. A composition according to claim 24 wherein said polyol is poly(tetramethylene ether) glycol.

* * * * *